3,255,052
FLAKE MAGNETIC CORE AND METHOD
OF MAKING SAME
Alton R. Opitz, Butler, Pa., assignor to Magnetics, Inc.,
a corporation of Pennsylvania
No Drawing. Filed Dec. 9, 1963, Ser. No. 329,293
5 Claims. (Cl. 148—105)

This invention is concerned with improvements in the manufacture of magnetic flake product and improved insulation of magnetic particles.

Cores formed from magnetic alloys, such as molybdenum-permalloy in particulate form, have been limited to permeabilities near or less than 200. While such cores found acceptance for other reasons, the relatively low permeabilities available limited use of these cores. This disadvantage is overcome by the teachings of the present invention which make possible magnetic particle cores having a permeability up to 550 and higher. The improvement in "Q" factor for lower frequency applications from such improvement in permeability will be obvious to those skilled in the art; see U.S. Patents to Beller No. 2,666,724, Altmann No. 2,744,040, or Adams 2,937,964 for discussion of "Q" factor.

The present invention teaches use of a novel insulation and novel process steps which combine to enhance physical characteristics of the magnetic metals employed and yield magnetic cores exhibiting higher permeability, improved "Q" factor, greater stability of permeability with flux changes, and improved permeability variance with temperature change.

The novel insulation and process steps employed to accomplish these improvements will be considered in detail in specifically describing a magnetic flake core manufacturing process.

Flake manufacture

Magnetic metallic materials are available commercially in powdered form or can be manufactured from melt material by well known procedures as disclosed in the U.S. patent to Adams No. 2,937,964. The powdered material can be annealed near 800° C. or higher in a hydrogen-containing atmosphere to relieve manufacturing and other strains. Annealing softens the powdered material and is important for achieving the desired flattening taught by the invention. A material to prevent agglomeration of powder can be used during annealing; such a material will be considered in later paragraphs.

After annealing, the metallic powder particles are rolled to form flakes. The method of rolling is important to the invention because of its control over physical dimensions, which, in turn, determine magnetic characteristics. Other things being equal, the permeability of a magnetic core will vary with flake diameter and the core losses will vary with flake thickness; both increasing with increases in these dimensions. In order to obtain large diameter thin flake this invention teaches use of lubrication of the powdered material during rolling. Dry rolling powdered molybdenum-permalloy in accordance with prior art teachings produced an average flake thickness near 52 microns, while the same material at the same rate of feed and roll settings produced an average flake thickness near 24 microns when lubrication between the powdered material and the rolls was employed. A heavy praffin base oil which will reduce the friction between a particle and the rolls and withstand the high pressure of the rolls is used. The oil is applied to the roll surfaces as such surfaces approach the nip between the rolls. The powdered metal is fed into the nip and the preapplied oil acts as a lubricated bearing surface between roll surface and particle. A satisfactory oil is available commercially from the Texas Oil Company under the designation Texaco 62L. Use of a lubricant also increases roll surface life several hundred percent.

For the high permeability (550) cores made possible by the teaching of this invention flakes should be rolled to an average thickness near 20–25 microns and an average diameter near 300 microns. This is made possible by use of lubricant, controlling the rate of feed, and maintaining good roll surfaces.

Flake formed by rolling with lubricant must be degreased before further processing. This may be accomplished by use of a solvent such as trichlorethylene after which the flake is dried until free flowing.

After removal of lubricant and drying, the flake material is prepared for annealing. In order to prevent agglomeration of the material during annealing pulverant mica, about 0.25% by weight of the flake material, is mixed with the flake. The advantages of using mica when annealing powder or at this stage of the process over other materials will be considered later in the description.

The flake, with mica added to prevent binding, is then annealed near 800° C. or higher, preferably near 830° C., while inhibiting oxidation of the material by control of the annealing atmosphere.

Flake insulation

The coating applied to magnetic flake material must be able to withstand a number of operations which tend to destroy its insulating properties. To be able to carry out its primary function of insulating, the coating must not be destroyed by the temperatures used in annealing a core or by the pressures exerted during compacting of the insulated particles to form a core. Additionally, the insulation material must act as a binder to give the compacted core physical strength. The insulation and insulating process taught by the present invention significantly increase the permissible annealing temperatures and this is believed to contribute greatly to the unobvious advantages in magnetic properties which result with the present invention.

A plurality of properly applied individual coats provide better insulation properties and result in lower air gap magnetic cores since lower weight, and volume, coatings provide the necessary electrical insulation between particles. In practice, the number of coats may vary from four upwardly; increasing the number of individual coats reduces clumping of insulated particles during processing.

In carrying out the process, insulating material is mixed with water; flake material is worked with the mixture and both are heated in a rotating drum, or similar apparatus, and the water is driven off. While continuing to agitate the material, it is heated to approximately 150° to 160° C. The material is then force cooled to approximately 80° C. The coating and heat curing process is repeated until the desired number of coats have been applied.

Some prior art insulation materials could withstand an anneal between 500° and 675° C., but not substantially higher. As 675° C. was approached, breakdown of the insulation and welding of the particles was such that significant increase in permeability was not obtained and core losses were significantly multiplied. The insulation of the present invention will withstand annealing temperatures of 800° C. to 1000° C. and higher. Moreover, these temperatures can be held a sufficient length of time to permit the desired annealing throughout a core of any of the present day magnetic alloys without significant breakdown of the insulation. For molypermalloy magnetic material, annealing time at full heat of 800° C. to 1000° C. for 15 to 30 minutes is preferred. In annealing a core, this may call for times in an annealing furnace in excess of an hour in order to properly relieve strains and develop the desired magnetic properties. None of the previously known insulating materials for magnetic powders could withstand such annealing treatment.

As a part of the invention, an insulating mixture has been produced which is suitable for work with the fine particles involved and which will withstand the high pressures involved in forming a core and the high temperatures involved in annealing a core, while maintaining excellent electrical insulation properties and performing necessary binding operations. The invention teaches use of mica as a basic component of the insulating mixture. It contributes to the unusual advantages of the insulating mixture because of its physical properties and because of the ability of various forms of mica to withstand suitably high temperature without breakdown of the mica or without breakdown of electrical insulation properties. A preferred form of mica for annealing applications calling for temperatures near 1000° C. and higher is natural phlogopite, $KMg_3(OH)_2AlSi_3O_{10}$. A suitable mica for annealing temperatures around 800° to 950° C. is muscovite, $KAl_2(OH_2)AlSi_3O_{10}$; other natural micas, as well as synthetic mica, $KMg_3AlSi_3O_{10}F_2$, are also suitable in this temperature range. With mica's cleavage property very thin, flexible, sheet-like insulation particles can be formed which are especially suited for flake particle insulation. The size of the mica particle should be selected based on the size of the magnetic particle being insulated. With 300 micron diameter flakes, mica particles up to 90 microns have been found satisfactory.

In the preferred embodiment, mica is mixed with potassium silicate, which acts as a binder for the mica, and with milk of magnesia. Particles of magnesium hydroxide from the milk of magnesia aid insulation by filling small interstices in a coating layer; during subsequent heating operation the magnesium hydroxide is converted to magnesium oxide. The mica used to prevent agglomeration in earlier steps of the process becomes part of the insulating mixture at this stage.

A four coat flake insulation process will be described specifically. To insulate 50 lbs. of flake a slurry of 20,000 cc. of water, 400 grams of mica, 255 grams of potassium silicate (technical grade 40.3° Baumé), and 425 grams of milk of magnesia (U.S.P grade) is made. These ingredients are kept thoroughly mixed when used in the process. For the first coating about 5000 cc. of the slurry with an additional 1000 cc. of water is placed in a heatable, rotatable drum with the 50 lbs. of flake. The flake and insulating materials are mixed; e.g. in a heatable rotatable drum. The water is driven off by heating the mixture and the flake is heated rapidly to approximately 150° to 160° C. and then cooled rapidly to approximately 80° C. Mixing continues throughout the process by rotating the drum. A second coat is applied and cured following the above steps. Similarly with the third and fourth coatings utilizing the entire insulation mixture. Sodium silicate may be substituted for potassium silicate. When necessary to equalize permeabilities between batches coating using 5000 cc. of water, 50 grams of mica, 32 grams of potassium or sodium silicate, and 50 grams of milk of magnesia may be added to the flake following the steps spelled out above.

Core manufacture

After insulation, flake is fed into a suitable die, toroidal or non-toroidal, so as to settle with its planar section parallel to the direction of magnetic flux. This placement may be carried out by a number of methods as disclosed in the U.S. patent to Gaut et al. No. 2,689,398 or Adams 2,937,964. One method involves use of a vibrating, rotating funnel positioned near the die opening. Most of the flakes drop into the die with their planar sections in planes perpendicular to the axis of the core and to a large extent maintain this orientation.

A circumferentially-continuous type die known in the art as a "unitary ring or one-piece die," as disclosed in the U.S. patent to Eyberger No. 3,063,098 is preferred in forming a toroidal flake core. The reduction of radial flexure with this type of die and the outer diameter taper serve to diminish or eliminate surface cracking. It is believed this is due to the uniformly graduated release of surface pressure on the outer diameter of a core during ejection from the die.

Flake particles themselves present a special problem in manufacture of a satisfactory core. The top edges of die formed flake cores will ordinarily have a substantially right angle relation between the inner and outer diameter side walls and the top surface of the core. The bottom will have rounded edges from most dies used in forming particulate matter. The rounded configuration is desired on all edges in order to avoid cuts or breakage of winding insulation by contact with sharp edges, especially during the winding process. Flake cores cannot be rounded at their top edges because of excessive crumbling and resultant damage to the core. In order to avoid this problem and permit production of flake cores which can have completely rounded edge configuration, the invention teaches use of a process which can be termed "powder topping." With this process, powdered magnetic material is added to the flake material in the die such that the top portion of the die formed core is powder rather than flake. After forming, the powder top can be rounded off by conventional methods at the edges without causing crumbling or damage to the core.

After core formation is complete, the core can be annealed at much higher temperatures than those previously available in the art. With the particle insulation taught by the present invention, the core is annealed at 800° to 950° C. or higher for the time required to relieve work strains and produce the desired magnetic properties. The core is then force cooled, above 15° and up to about 75° C. per minute, in a non-oxidizing or inert atmosphere, such as $H_2$, or mixtures of $H_2$ and $N_2$. This fast cooling after anneal considerably increases the stability of permeability with flux changes.

After the annealing process, the core can be heated in air near 250° C., cooled in water, and dried near 150° C. to improve the loss characteristics. An alternative treatment utilizes mechanical vibration near 60 c.p.s. applied for 5 to 15 minutes, as necessary. These treatments serve to reduce or eliminate welding of the flakes which may have taken place at the surface of the core.

Cores are then coated with a special paint, e.g., epoxy or enamel, to minimize entrance of moisture and potting compounds, and to insulate the core from the windings.

Properties

It is desirable to have the permeability of a core remain constant with changes in flux density. With the 550 permeability flake core made possible by the teachings of the present invention, the permeability remains substantially constant at 550 from 10 gausses through 100 gausses. From 100 gausses through 4000 gausses, the permeability change is less than 10%, increasing to near 600 at 1500 gausses.

It is also desirable to have the percentage change of inductance with temperature be a substantially straight line function over the range of temperatures encountered in operation. With a 550 permeability core produced in accordance with the invention, the percentage change in inductance varies as a straight line function from near −2% at −50° C. to +2% at 85° C. With this straight line function variation, an inductor can be combined with commercially available capacitors having straight line function percentage changes in capacitance to produce resonant circuits which are frequency stable over the range of temperatures encountered.

The teachings of the present invention find particular application in treating moly-permalloy, but are not limited to this alloy. Moly-permalloy which contains about 2% molybdenum, 81% nickel, and 17% iron will produce high permeability cores in flattened particulate form when high temperature anneals are made possible as taught by the present invention. However, the insulation composition and procedure can be applied to other materials which do not require high temperature anneals and also to magnetic particles other than flakes.

What is claimed is:

1. Magnetic flake core manufacturing process comprising annealing powdered magnetic metallic material including molybdenum, nickel and iron near 800° C. and higher for five to ten hours, lubricating roll surfaces to be used in rolling material, rolling powdered material between lubricated roll surfaces to form flake material having an average thickness of 20 to 24 microns and an average diameter near 300 microns, degreasing the flake material to remove substantially all lubricant from the rolled flake material, blending pulverized mica with degreased flake material to inhibit agglomeration, annealing the mica blended flake material near 800° C. and higher for five to ten hours in hydrogen-containing atmosphere, applying a plurality of individual electrical insulation coatings to annealed flake material with intermediate drying of each coating, at least one such coating including mica, feeding insulated flake material into a circumferentially-continuous toroidal-configuration die such that flakes are arranged in the die in substantially parallel relationship, adding powdered magnetic metal material on top of the flake material in the die, pressure forming flake and powdered material in the die to form a flake core, annealing the core in hydrogen near 800° C. to 1000° C. for 15 to 30 minutes, cooling the annealed core at a rate near 25° C. per minute in a non-oxidizing atmosphere, rounding off powdered material edges of the core, coating outer surfaces of the core to minimize moisture penetration of the core.

2. The process of claim 1 further including the steps of applying mechanical shock to the core to reduce welds between flakes.

3. Magnetic flake core manufacturing process comprising annealing powdered magnetic metallic material including molybdenum, nickel and iron near 800° C. and higher, rolling the annealed powdered metallic material to form flake metallic material having an average thickness of 20 to 24 microns and an average diameter near 300 microns, blending pulverized mica with the flake metallic material to inhibit agglomeration of the flake metallic material, annealing the mica blended flake metallic material near 800° C. and higher in hydrogen-containing atmosphere, applying a plurality of individual electrical insulation coatings to the annealed flake metallic material with intermediate drying of each coating, at least one such coating including mica which is non-decomposing at a temperature of 1000° C. and having a particle size near 10 to 20 microns, feeding the mica insulated flake metallic material into a die such that metallic flakes are arranged in the die in substantially parallel relationship, pressure forming the flake metallic material in the die to form a flake core, and applying a high temperature anneal to the core without substantial breakdown of the mica insulation of the flake metallic material using annealing temperatures about 800° C. to 1000° C. for fifteen to thirty minutes.

4. A magnetic core having a permeability near 550 comprising magnetic flake particles having an average thickness near 20 to 25 microns and an average diameter near 250 to 350 microns, the flake particles being arranged in substantially parallel relationship and coated with an electrical insulation including a mica which is non-decomposing at 1000° C., the mica being present in an amount effective to permit annealing of the core at temperatures around 1000° C. without substantial breakdown of the electrical insulation.

5. A toroidal magnetic core with rounded edge configuration at intersections of inner and outer sidewalls with axial end surfaces of the core comprising magnetic flake and magnetic powdered particles coated with electrical insulation, with the coated magnetic powdered particles forming the rounded edge configuration at one axial end of the toroidal core and the coated magnetic flake particles being arranged in substantially parallel relationship in the remainder of the toroidal core.

References Cited by the Examiner

UNITED STATES PATENTS

| 1,297,127 | 3/1919 | Elmen | 117—100 |
| 2,105,070 | 1/1938 | Bandur | 148—104 |
| 2,424,054 | 7/1947 | Roach | 117—100 |
| 2,450,327 | 9/1948 | Cogan et al. | 117—160 |
| 2,503,947 | 4/1950 | Haskew | 117—100 |
| 2,720,453 | 10/1955 | Altmann | 148—104 |
| 2,864,734 | 12/1958 | Adams et al. | 148—104 |
| 2,885,366 | 5/1959 | Iler | 117—100 |
| 2,914,107 | 11/1959 | Gaines | 117—160 |
| 2,997,776 | 8/1961 | Matter et al. | 117—160 |

FOREIGN PATENTS 833,504  4/1960  Great Britain.

DAVID L. RECK, *Primary Examiner.*

HYLAND BIZOT, *Examiner.*

N. F. MARKVA, *Assistant Examiner.*